United States Patent [19]

French

[11] 3,875,766

[45] Apr. 8, 1975

[54] METHOD FOR THE DIRECT MANUFACTURE OF DISCRETE TEMPERED GLASS SHEETS

[75] Inventor: Walter K. French, Montrose, N.Y.

[73] Assignee: Fifth Research Corporation, New York, N.Y.

[22] Filed: Dec. 20, 1973

[21] Appl. No.: 426,526

[52] U.S. Cl. .......................... 65/97; 65/112; 65/174
[51] Int. Cl. ........................................ C03b 27/00
[58] Field of Search .......... 65/95, 96, 97, 112, 174, 65/175, 176

[56] References Cited
UNITED STATES PATENTS

| 3,301,650 | 1/1967 | Ward ........................... | 65/95 |
| 3,754,884 | 8/1973 | McDavid et al. ............... | 65/97 |

Primary Examiner—Arthur D. Kellogg
Attorney, Agent, or Firm—Mark T. Basseches; Paula T. Basseches

[57] ABSTRACT

The present invention relates to a method for manufacturing tempered glass sheets directly from a ribbon or band of glass emerging from a glass fabricating furnace, the terminal stages of a float process or the like. The method is characterized by subjecting a continuous ribbon or band of glass proceeding directly from a glass manufacturing installation into a quench which rapidly reduces the temperature of the external surfaces of the glass, scoring and breaking the glass at an intermediate stage in the quench procedure, and specifically at the point or range within the quench where the surface of the glass is susceptible of being scored by a scribing apparatus without significant permanent plastic deformation of the surface surrounding the score line, and where the temperature internally of the glass is at least above the strain relief temperature of the specific glass formulation being processed. Optimally, scoring and breaking are effected within the quench at or near that point or range in the quench cycle wherein the temperature differential between the external surfaces and the interior of the glass is greatest. Means may be provided for varying the rate at which heat is extracted during the quench so as to prolong the time period within which the band may be scored and broken.

12 Claims, 3 Drawing Figures

SURFACE TEMPERATURE

METHOD FOR THE DIRECT MANUFACTURE OF DISCRETE TEMPERED GLASS SHEETS

BACKGROUND OF THE INVENTION

1. Field of the Invention

The present invention is in the field of glass manufacture, and more particularly is in the field of manufacturing tempered glass sheets.

2. The Prior Art

As is well known, tempered glass possesses certain significant advantages over conventional annealed glass and by reason of such advantages, the use of tempered glass sheets is increasing notwithstanding a significant cost differential between tempered and annealed glass.

Tempered glass possesses the advantage of increased mechanical strength as well as increased resistance to thermal and mechanical shocks. In addition, tempered glass provides substantial safety factors in that when it does break, the entire piece "dices" or falls into a multiplicity of small fragments, the edges of which are relatively dull. The safety advantages of tempered glass are such that its use has been legally mandated in certain installations.

Notwithstanding the known superiority of tempered glass, the increased rate at which tempered glass is being used has been inhibited by the substantially greater cost of tempered glass than annealed glass.

Since glass sheets cannot be cut after tempering, tempered sheets have conventionally been available only in a limited number of stock sizes, a factor further inhibiting the use of tempered glass.

Tempered glass is conventionally manufactured by first cutting annealed glass sheets to the desired size. The exposed edges of the subdivided sheet to be tempered are thereupon carefully ground to preclude the existence of microscopic fissures along the edges. Thereupon, the edge-ground sheet of annealed glass is introduced into an oven and is heated to a temperature which varies in accordance with the glass composition employed, being normally in the range of about 1050° to 1250° F for conventional soda-lime window glass compositions.

The heated sheet is thereupon introduced into a quench, which functions rapidly to extract heat from the surfaces of the sheet, the quench normally including means for impinging high volumes of air at ambient temperatures against the exposed surfaces of the sheet with equal distribution, so that the cooling effects are substantially uniform on all areas of the sheet surfaces. After a period of time in the quench, the time being a function of the thickness of the glass, the sheet is removed and further cooled, if necessary.

In the quenching procedures, the external surfaces of the glass cool and contract prior to the interior of the glass, the interior components being still mobile. On cooling of the interior components of the glass, the tendency of such components to contract is resisted by the fact of their connection to the already cooled and immobilized external surfaces, whereupon the external surfaces of glass are permanently under compression and the internal components under tension.

Obviously, the conventional method of producing tempered sheets which involves slowly cooling a glass band emerging from a melt to anneal the same, cutting the annealed band into sheets, grinding the edges of the subdivided sheets, and reheating the edge-ground sheets, involves significant costs and expenditures of energy, particularly considering the fact that the crude glass emerging from the melt is already heated and must slowly be cooled in annealing ovens, only to be reheated for tempering. Moreover, even where a careful grinding of the edges of the annealed sheets preparatory to tempering has been carried out, a substantial incidence of breakage is experienced in the tempering process and particularly in the initial phases thereof. Attempts have been made to eliminate the grinding step, but an even higher incidence of breaking of the annealed sheets has been experienced in such case.

Various methods have been suggested for the direct fabrication of tempered glass sheets without the intermediate steps of annealing, cutting, reheating and quenching.

By way of example, reference is made to U.S. Pat. Nos. 2,243,149, 2,291,127 and 2,293,537. Each of the noted patents is generally directed to forming glass melt into a band or ribbon and, without annealing, subjecting the glass to a quenching step. Each of the noted patents suggests cutting the ribbon to separate the ribbon into discrete sheets before or after the quench.

Insofar as is known, the methods suggested in the patents have not proven commercially feasible, due principally to deficiencies in separating discrete sheets from the continuous ribbon.

The patents suggest a variety of ways of separating the sheets, including rollers having mating lands which press into the molten glass, separating discrete segments which are thereafter subjected to a quench; the use of blow pipe cutting type apparatus on a continuous ribbon which has already been tempered; formation of valleys in the glass ribbon which is thereafter quenched, the glass increments demarcated by the valleys being separated by breaking the valleys after cooling, etc.

Each of the noted separating steps has been attended by sufficient disadvantages to preclude commercial acceptance.

The operation of dividing a molten glass band into discrete sheets is, at best, a difficult one, resulting in the formation of irregular edges, the surface areas of the band adjacent the edges evidencing irregularities and ripples. Similar effects are observed in the case of blow pipe cutting, (the method suggested for cutting sheets from an already tempered band), such method being inherently time consuming, inexact, and resulting in addition to a high percentage of breaking and detempering of the sheet in the areas of application of the flame and adjacent areas. The method of thinning and thereafter separating the processed sheets in the thinned separation areas has involved disadvantages mentioned above in respect of separating molten glass, and the additional disadvantage of substantial incidences of breakage of the entire sheet, since it is obvious that the remaining flash must be somehow removed before the sheets may be advantageously employed.

Thus, notwithstanding the obvious theoretical economies of directly forming tempered glass sheets without annealing, cutting, grinding, etc., all known commercial tempered sheet is produced from annealed stock.

A further factor increasing the cost of tempered glass over annealed glass is that tempered glass sheets cannot practically be subdivided. If tempered glass could be readily cut, it would, of course, be feasible directly to produce a substantial length of tempered glass ribbon and thereafter subdivide the same.

A method suggested for the cutting and drilling of tempered glass is disclosed in U.S. Pat. No. 3,150,950, which method involves treating the sheet temporarily to relieve the permanent strain structure in the glass and cutting while the sheet is in the strain relieved condition.

In accordance with the method of the noted patent, a tempered glass sheet is heated to a temperature below the temperature at which the permanent strains within the sheet are relieved (strain relief temperature), and the sheet thereupon subjected to a cooling blast on its surfaces. The differential temperatures within the glass sheet, wherein the hotter interior is in a relatively expanded condition as contrasted with the cooler external surfaces, temporarily counteract the permanent strain pattern, permitting the glass to be scribed and broken in a conventional manner. After the tempered glass has been cut or drilled, it is allowed to cool, following which cooling the original strain patterns are said to return.

A substantial problem inhering in the method of the abovve described patent lies in the fact that the cut or drilled sheet leaves an exposed tension zone along the cut edge, rendering the sheets far less stable than conventionally fabricated tempered glass sheets. It is not uncommon for a tempered sheet processed as above described to dice spontaneously after the passage of time, such dicing perhaps resulting from an unexplained spreading of microscopic fissures within the tension zone. Additionally, dicing may result from shock applied to the sheet, and particularly to an exposed tension zone, with the result that utilization of the cut sheets is feasible only where great pains have been taken to insulate and protect the exposed tension zone from contact with any object, and the sheets themselves from any vibratory influence.

SUMMARY

The present invention is directed to a method of manufacturing discrete tempered glass sheets directly from a ribbon or band of glass emerging from any conventional glass fabricating procedure, such as, for instance, from the float process, a basin furnace, etc. In accordance with the invention, glass well above the strain relief temperature and in the neighborhood of the softening point, about 1050° to 1300° F for a conventional soda-lime window glass composition, is introduced into a quench wherein substantial volumes of air at ambient temperatures are directed against the opposed surfaces of the glass as the same is continuously advanced, the glass ribbon, in the interim, being supported on spaced rollers, air float or like apparatus which permits maximum access of the quench air to the surfaces of the glass ribbon.

At an intermediate portion of the quench cycle and at a point and time whereat the surface of the glass is subject to scribing by a conventional tungsten carbide scribing wheel operated at normal scribing speeds, (such temperature for the glass composition noted being in the area of about 900° F or below) a transverse scribe line is formed on the surface of the advancing ribbon. Optionally and preferably, longitudinally extending scribes are formed when the glass is in the noted state.

At the time of scribing, components internally of the glass should be at a temperature above the strain relief temperature and preferably substantially above such temperature. The strain relief temperature for the soda-lime glass composition noted is about 900° to 950° F.

As promptly as possible after the scribes are formed, the glass is broken, first along the transverse scribe line and thereafter the longitudinal scribe lines, the severed glass elements being thereafter separated to provide access of the quench fluids to the glass edges.

Quenching is completed and the separated glass sheets removed for further cooling outside the quench, if necessary.

Preferably, the scribing and breaking operations are effected at the point wherein there is a maximum temperature differential between the surfaces of the glass sheets and the interior of the glass. In practice it has been determined that where a ¼ inch glass sheet is processed in a conventional quench, as hereinafter described, such maximum temperature differential occurs from 6 to 7 seconds after introduction into the quench.

By manufacturing tempered glass in the manner aforesaid, a multiplicity of advantages are derived. The procedure permits, for the first time, a practical method of forming discrete tempered sheets from a glass band drawn from a melt. Also, the forces required to be applied to the glass ribbon to fracture the same along the scribe lines are substantially less than are required to be applied to effect a similar fracture on a scribed annealed glass sheet at room temperatures. As a result, the apparatus for effecting the fracture along the scribe line and the treatment accorded the glass to effect fracture are substantially less violent than in conventional scoring and fracturing.

A further significant advantage lies in the fact that the discrete sheets formed do not contain any exposed tension zones, the edges of the sheets, if not fully tempered, being at least heat toughened.

It will be further observed that the necessity for edge grinding to remove microscopic fissures, which forms a necessary element of the tempering of annealed glass sheets, is completely eliminated in accordance with the above described procedure.

Moreover, the procedure eliminates a step which is the cause of a substantial incidence of breakage in the formation of conventionally tempered glass sheets, namely, introduction of annealed sheets into a tempering oven.

A further and substantial advantage of the above described method lies in the energy conserving aspects thereof, resulting from utilization of the heat of melt to produce a temper and eliminating the energy wastage inherent in the annealing ovens and tempering ovens heretofore required.

In accordance with embodiments of the invention, processing by way of scribing and breaking is facilitated through the utilization of apparatus in or forming a part of the quench which prolongs the state in which scribing and breaking are advantageously effected. The prolongation of the optimum scribing-breaking period is of particular importance in the processing of thin glass sheets, such as ⅛ inch sheets utilized in storm doors or windows, since the total quench period for such glass required for tempering in a conventional quench may be less than six seconds.

In accordance with a preferred embodiment of the invention, the time during which the band is maintained in the optimum temperature range for scribing and breaking is prolonged by specially tailoring the application of quench fluids to the glass surfaces. The quench is adapted to subject the surfaces to an initial period of rapid cooling to bring the sheet to or near the desired condition for cutting. The flow of quench fluids against the advancing glass band is thereafter reduced and then progressively increased so that after the initial rapid chill, heat is extracted at an essentially linear rate, it being recalled that a given volume of quench air is effective to extract more heat when the glass is hotter or at an earlier stage in the quench than when it is cooler at a later stage. By this means, the time during which maximum temperature differential exists within the sheet and, hence, the optimum scoring and breaking period is extended.

An alternative means for extending the cutting and breaking period involves the interposition in the quench of a microwave or dielectric heater, the heating assembly inducing a more or less uniform heat rise throughout the thickness of the glass in the zone, as opposed to heating units which heat the external surfaces preferentially. The apparatus includes a quench means adjacent the homogeneous heating zone to extract heat from the surfaces of the glass within the zone. In this manner there is created a means for maintaining or inducing a temperature differential within the glass as created by the initial rapid chill whereby the time schedule within which scribing and breaking may be effected is expanded.

With the foregoing in mind, it is an object of the present invention to provide a method and apparatus for forming discrete tempered glass sheets utilizing the heat of melt of the glass.

A further object of the invention is the provision of a method of the type described wherein separation of components of a continuously fed glass ribbon is effected at an intermediate stage during the quench cycle by a simple scribing and breaking operation, the scribing being effected at a point in which the interior temperatures in the glass sheet are above the strain relief range, and the surface scribed sufficiently cool to permit the formation of the usual scribing fissures.

Still a further object of the invention is the provision of a method of the type described which eliminates the necessity for grinding the edges of the sheets.

Still a further object of the invention is the provision of a method of the type described wherein the forces required to effect breaking along scribe lines are substantially less than required to be exerted in the processing of glass at room temperatures.

Still a further object of the invention is the provision of a method of forming tempered glass sheets which includes the steps of introducing increments of glass emerging from a melt at a temperature suitably high for tempering into a quench to induce a temperature differential between the surfaces of the glass and the interior, forming at least a transverse scribe line across the glass increments at a point in time when the surface is sufficiently cool for scribing yet the interior is at a temperature above the strain relief temperature, thereafter causing the glass to fracture along the scribe line, separating the discrete increments formed as a result of the breaking operation, and continuing the quench to fix a temper in the discrete sheets, the edges of the sheets being free from exposed tension zones.

Still a further object of the invention, in accordance with an embodiment thereof, is to prolong the period of time during which the band or increments severed therefrom may be advantageously scribed and broken, one manner of extending such time being to control the application of quench fluids so as to produce an initial rapid quench, and a subsequent reduced rate quench, the subsequent effective quench rate progressively increasing.

An object of the invention in accordance with a further embodiment is the provision of a method as described above and including the step of causing glass within the quench to be homogeneously heated while at the same time extracting heat from the surface components of the glass, to maintain a temperature differential between the interior and exterior portions of the glass whereby the time within which scribing and breaking may be advantageously effected is prolonged.

A further object of the invention is the provision of apparatus for carrying out the objects set forth above.

To attain these objects and such further objects as may appear herein or be hereinafter set forth, reference is made to the accompanying drawings, forming a part hereof, in which.

Figure 1:
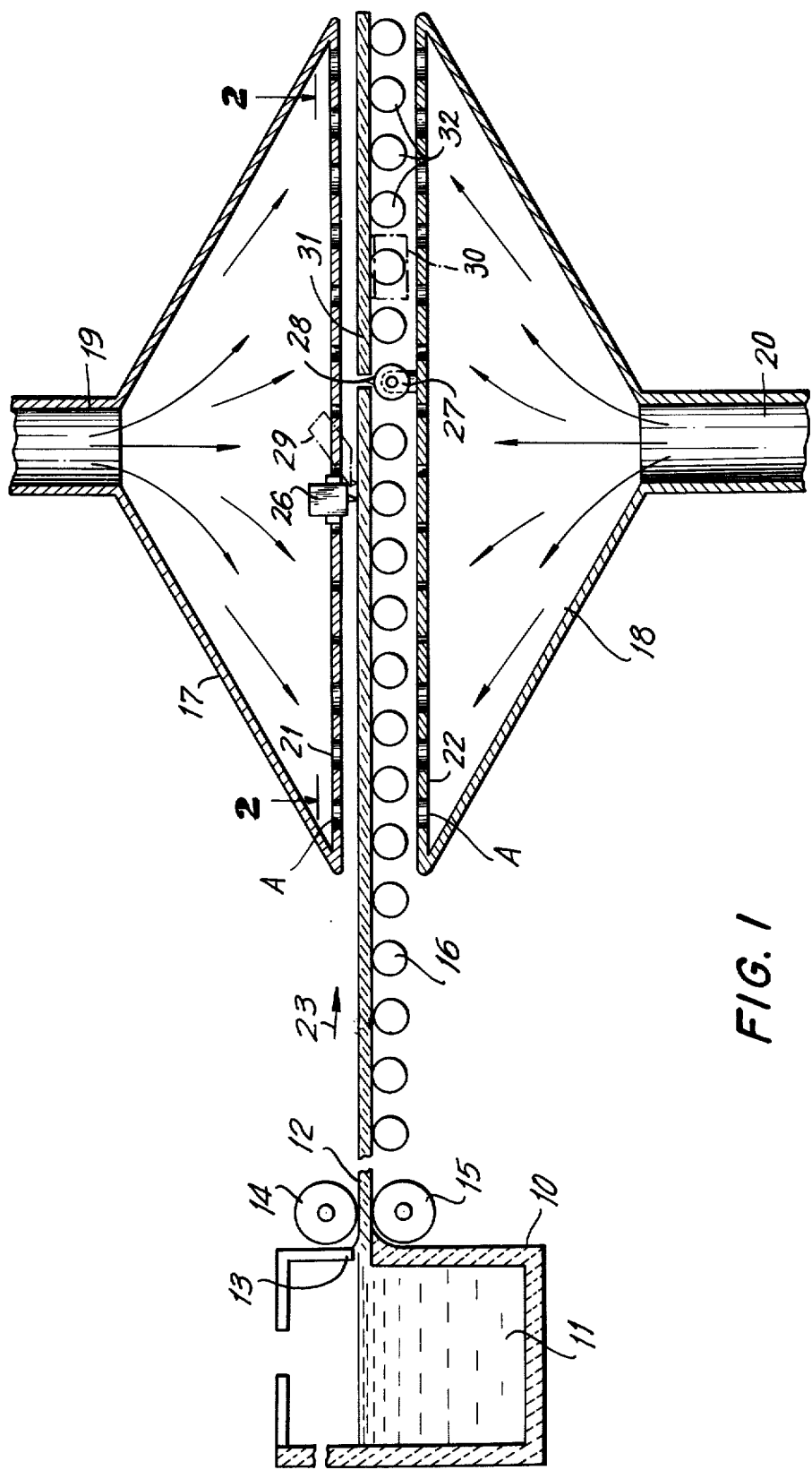
FIG. 1 is a diagrammatic view of a glass processing apparatus for carrying out the method of the instant invention.

Referring now to the drawings, there is disclosed in FIG. 1 a diagrammatic representation of a furnace 10 containing a molten batch 11 of the glass. While it will be recognized that the method and apparatus of the instant invention is suitable for the processing of glasses of a multiplicity of formulations, the times, temperatures and values set forth in the instant application are appropriate to the processing of a conventional soda-lime glass composition of ¼ inch thickness, as typically used in the manufacture of windows, etc.

As will be appreciated by workers in the art, variations in composition, thickness, and processing equipment will mandate modifications of the times and temperatures set forth. A degree of "cut and try" variation as normally experienced in the initial establishment of any glass fabricating program of even the most conventional nature will enable the instant process to be adapted to the processing of most glasses in many existing quench installations.

The soda-lime glass composition in connection with which the values hereinafter set forth have been derived has approximately the following properties:

| | |
|---|---|
| flow point | 1690°F |
| soft point | 1350°F |
| anneal point | 1020°F |
| strain point | 950°F. |

While the invention, for illustrative purposes, is described in connection with a glass produced in a basin type furnace 10, it will be appreciated that the procedures are applicable to a band or ribbon of heated glass however produced, and particularly to a band or ribbon emerging from a float type process, e.g., a process wherein the ribbon is formed on a bath of molten metal, such process being particularly advantageous in that the resultant glass is virtually free from surface irregularities.

In the illustrated embodiment, glass band 12 flows through the usual adjustable gate mechanism 13, passing through delivery rolls 14, 15, thence over transport rollers 16 into a quench wherein a chilling fluid, normally air at ambient (70°F) temperatures, is directed against the opposed surfaces of the glass 12. In the illustrated embodiment, the diagrammatically illustrated quench includes manifolds 17, 18 connected via conduits 19, 20 to a source of quench fluid.

The manifolds 17, 18 include discharge plates 21, 22, respectively, incorporating a series of discharge apertures A, A, the apertures A, particularly in the bottom plate 22, being aligned in the spaces between the transport rollers 16.

As is conventional, the glass band, upon reaching the quench zone, e.g., the area between manifolds 17 and 18, will have been rolled, doctored and formed to the desired thickness and smooth surface configuration, the band entering the quench zone at a temperature suitably high for tempering. Normally, the glass composition set forth may be satisfactorily tempered by introduction into the quench at a temperature of from about 1050°F to about 1250°F. In the graph, FIG. 3, however, the values have been charted on the premise of the glass entering the quench at a temperature somewhat in excess of 1300°F.

Figure 2:
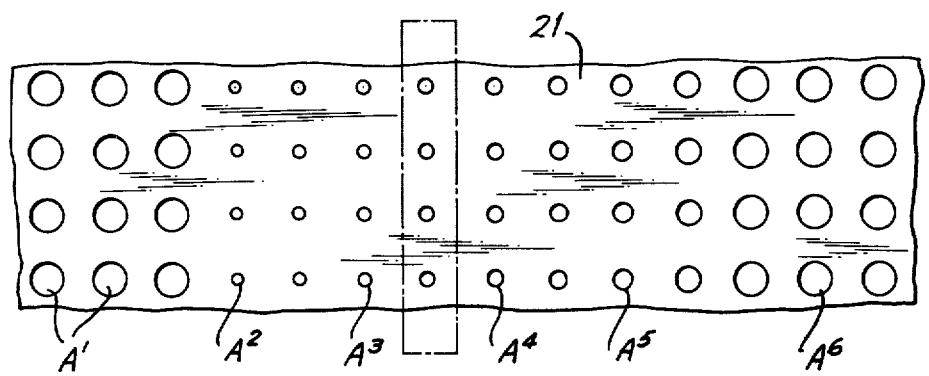
FIG. 2 is a section taken on the line 2—2 of FIG. 1.

Referring now to FIG. 2 wherein there is disclosed a detailed view of discharge plate 21, it will be seen that the apertures A1 adjacent the beginning of the quench zone are quite large, that the apertures A2 following the introduction portion of the zone are substantially smaller, the apertures A3, A4, A5, etc. becoming progressively larger in a downstream direction within the quench, the apertures A6 being of a size approximating the introductory apertures A1. As will be appreciated from the ensuing discussion, the purpose of the variably sized apertures is, in accordance with a preferred embodiment of the invention, to induce a rapid initial heat extraction from the glass in registry with the apertures A1, to produce in the glass a predetermined range of temperatures wherein the surfaces of the glass are at or near a selected desired temperature, the interior of the glass being at a substantially higher temperature.

As will be evident from the reduced size of apertures A2, a reduced amount of chilling air will be directed against the band when in registry with such apertures as compared with the amount of chilling fluids impinged against the band surfaces in the area containing apertures A3, A4 and A5. Due, however, to the fact that the glass is becoming progressively cooler as it travels downstream within the quench in the direction of the arrow 23, the rate of heat extraction from the glass will be generally even since the heat extracted per unit volume of air will decrease as the glass cools.

While the illustrative quench discloses fixed apertures, it is known practice, in order to prevent localized strain differentials, to provide oscillating apertures or nozzles, etc.

Figure 3:
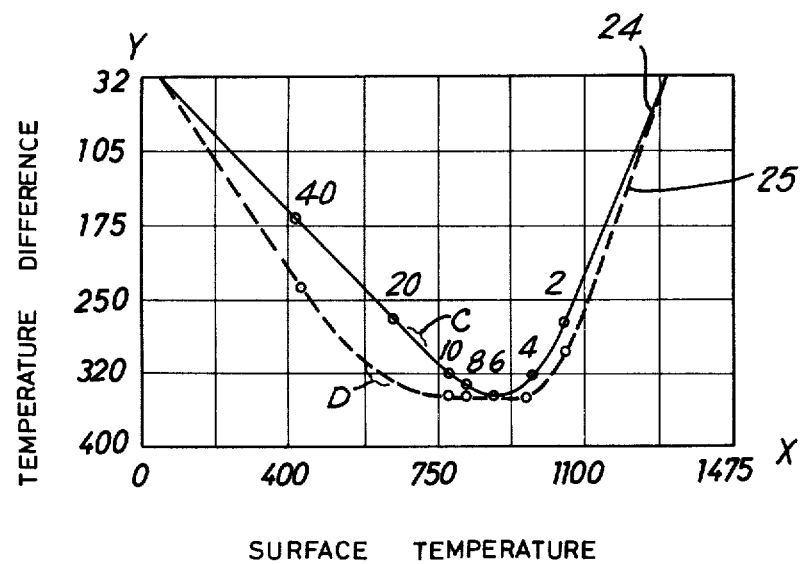
FIG. 3 is a graph representative of temperature values of the glass in the course of processing.

Turning now to the graph, FIG. 3, the solid line curve 24 represents a plot of surface temperatures of the cooling band on the X axis against the temperature differential between the surface and the interior, the differential being plotted along the Y axis. The curve 24 represents the values using an essentially conventional quench wherein the amount of cooling fluids dispensed is essentially constant through the quench zone.

The dash curve 25 is similar to the curve 24 except that a quench in accordance with that shown in FIG. 2 has been employed, i.e., wherein the original rapid chill rate is somewhat greater than the quench represented by the curve 24, the band being subjected to reduced and then progressively increasing quenching effects. The time in seconds is marked on the curves 24, 25.

Comparing the dash and solid line curves, it will be apparent that the maximum temperature differential of about 340°F between the surface temperature and the interior temperature of the band is achieved in the use of each type of quench. It will be further observed, however, that the maximum temperture differential in the conventional curve 24 remains at or near its maximum value only for a relatively short period of time, whereas in the case of the progressive or variable quench shown in FIG. 2 and represented by the line 25, the time range wherein temperature differentials approximating the maximum exist between surface and interior is substantially extended.

Since the scoring and breaking procedures in accordance with the instant invention are advantageously carried out at that period of time when substantial temperature differentials exist, it will be apparent that a quench producing a curve having the chharacteristics of the curve 25 is preferable to that having the characteristics shown in curve 24, although it should be understood that the instant method may satisfactorily be performed in a conventional quench (curve 24) despite the fact that the operations must be carried out within a reduced time period.

The present invention is predicated upon the discovery that at a critical interval within the quench cycle wherein at least one surface of the glass, and preferably both, are sufficiently cool to be scored and the interior of the glass is above the strain relief range, the glass may be readily scored and broken along the score line. The increment of the band severed by the above noted procedure is preferably separated from the lead edge of the band such as to permit quench fluids to contact the trailing edge of the increment as well as the lead edge of the band. It will be further appreciated that when the glass is in the critical state, the side edges or moil may be removed by a scoring and breaking operation in much the same manner as in the trimming of a cool annealed glass.

Referring again to the drawing, FIG. 1, the numeral 26 represents diagrammatically a transverse scoring mechanism located within the quench at a position to form a transverse score or scribe line rapidly across the ribbon, the ribbon portions in registry with the score mechanism 26 being in the critical condition set forth hereinabove.

Numeral 27 represents a diagrammatic illustration of a breaker mechanism including an eccentric ridge 28, the mechanism being synchronized to rotate the ridge 28 into contact with the glass sheet and bump against and flex the sheet at a line in registry with the score or scribe line formed by the mechanism 26.

The words "score" are used in the instant application in their usual sense, i.e., to define a procedure in which a conventional diamond or tungsten carbide wheel drawn across the surface of the glass forms in the glass minute fissures or cracks propagated into the body of the glass to a depth below the depth of the lowermost surface of the wheel. Thus, the words "scoring" and "scribing" as employed herein signify that there is little or no permanent plastic deformation of the glass in the areas surrounding the score or scribe.

In the soda-lime formulation discussed hereinabove, it has been determined that the highest temperature at which scoring may be advantageously carried out is about 900°F. In practice, in setting up a program or campaign for the fabrication of glass in accordance with the method of the invention, experience has demonstrated a practical method for determining the optimum scoring time.

Obviously, if the scoring member is drawn across the band and substantial deformation of the band occurs, the depthwise fracture necessary for breaking will not be formed and there will merely be an embedded groove formed across the glass. If the score is formed at a somewhat later time during the quench and the fissures or cracks are formed as desired, without substantial plastic deformation but a degree of "fringing" is observed (i.e., formation of minute ledges or shelves of glass to about 1/32 inch to either side of the score line which crumble and become separated from the body of the glass as a result of the scoring), the score has been formed slightly too early in the quench, the fringing effect being believed to result from the fact that the surface of the glass at such early point is under slight tension.

Satisfactory breaking may be accomplished, notwithstanding such fringing, and the invention is intended to encompass scoring accompanied by some fringing, it being understood that optimally the scoring should be effected at a time period somewhat after that at which fringing effects are encountered.

The scored glass is to be broken as soon as feasible, the force required to break the sheet on the score line increasing dramatically as the interior temperatures of the glass approach the lower limit of the range noted.

Accordingly, a pragmatic way of establishing optimum score position within the quench is the earliest point at which scoring without fringing may be accomplished. This point normally has been found to fall generally within the period when a maximum difference in temperture between the surfaces and the interior of the band is present.

Referring again to FIG. 1, 29 is a diagrammatic illustration of a side scorer and 30 a side breaker, the breaking of the scored side edges being effected promptly following separation of the increment 31 from the band 12 by the transverse breaker 28.

Preferably the rollers 32 operate at a slightly greater rate of speed than the rollers preceding the breaker mechanism whereby a separation of the severed increment 31 from the band is effected promptly following breaking, so that the trailing edge of the increment and the lead edge of the band are subjected to quench influences whereby a tempering, or at least a heat hardening of all of the edges, e.g., side and end edges after removal of the moil, is completed in the quench.

Referring to the graph, FIG. 3, the letter C, curve 24, represents approximately the end of the range wherein satisfactory scoring and breaking may be accomplished, the optimum scoring time being at about six seconds into the quench. The approximate end of the said range is shown at D on curve 25. A comparison of the elapsed time to reach C and D discloses that the quench arrangement shown in FIG. 2 substantially prolongs the period during which scoring and breaking may be effected, simplifying such operations.

Experimentation has indicated that the time within which scoring and breaking may be prolonged may also be accomplished by subjecting the band within the quench to a homogeneous heating source, i.e., a dielectric heater or like apparatus which heats the entire thickness of the glass essentially equally, as opposed to a preferential surface heater, the glass, after application of homogeneous heating efffects, being chilled on its surfaces to establish, maintain or prolong the desired differential between the temperature of the surfaces and the interior.

It will be readily recognized that the quench characteristics will in large measure affect the time at which scoring and breaking should be carried out. The quench used in conjunction with the instant embodiment has an average heat extraction capacity of about 37 BTU per hour per square foot for each degree Fahrenheit of temperature differential between the glass surface and the quench air medium.

Various means may be employed to form the transverse scribe along the moving band, reference, by way of example, being made to U.S. Pat. Nos. 3282,140 and 3244,337.

In the processing of thinner glass, such as ⅛ inch glass, the scribing and breaking must necessarily be carried out after the band has been subjected to lesser cooling influences than in the case of thicker glass.

In view of the shorter time cycles required for ⅛ inch glass, the utilization of a progressive acting quench, as shown in FIG. 2, is a particular importance.

As previously noted, the method of the present invention may be adapted to the processing of other glass formulations by suitable variation of times and temperatures, as will be recognized by those skilled in the art.

In adapting the method to other glass formulations, the critical factors to be considered, as outlined above, are:

a. that the glass band, when introduced into the quench, be at a suitably high temperature for tempering and preferably, but not necessarily, at a temperature somewhat above that normally employed to temper an annealed sheet of the same formulation, care being taken not to over-temper the glass;

b. that the scribing operation be performed within the quench at a time when the scribed surface is sufficiently cooled to be susceptible of receiving a scribe line providing the necessary microscopic fissures propagating into the interior of the sheet, the point at which such desirable effect may be observed being when the surface glass has become sufficiently hard that the scribe, operating at normal pressures, will not merely indent or cause permanent plastic deformation of the glass, the interior of the sheet, at such time, being at a temperature above, and preferably well above, the strain relief temperature;

c. that the actual breaking and separation along the scribe line be effected while the interior temperature remains above, and preferably as high as possible above, the strain relief temperature.

It is further important that the fracture along the scribe line be effected as promptly as possible following scoring since within the noted temperature range, and particularly toward the upper end thereof, there is a tendency for the fissures to heal, rendering breaking on the score line difficult, or at least involving substantially a greater chance of destruction of the sheet.

Guidance for adaptation of the process to other glass formulations may be had by referring to the standard characteristics tables for such glasses (A.S.T.M. Designation C 336 - 54 T) to derive such values as the strain relief point, etc.

The pressures required to fracture the glass along a freshly formed score line are very substantially less than the pressures which must be applied to a comparably scored and sized sheet of annealed glass. The reduced pressure necessary for performing the break is a significant advantage in that the instances of shattering resulting from the application of high flexing forces are avoided.

In practice it has been determined that (for reasons which are not altogether apparent) the use of a scoring wheel, the side edges of which define a narrow acute angle is preferable to a wider angled scorer. Where scoring is effected early in the quench, the advantages of a narrow angled scoring device become increasingly apparent.

In the overall process, as contrasted with the currently employed tempering procedures, e.g., annealing, cutting, grinding, reheating, the instance of waste due to breakage is significantly reduced.

Additionally, in the method of the present invention, substantial savings by way of energy expenditures are realized in that the lengthy annealing process is dispensed with entirely, as is the reheating of the annealed and cut-to-size sheets. In addition, the edge grinding procedures may be entirely dispensed with.

As a result of the procedure, tempered glass may be produced at a cost equal to or less than the cost of producing a comparably sized sheet of annealed glass, making the use of tempered glass practicable in storm door, window and a variety of other installations wherein cost factors previously precluded its use.

As will be readily recognized by those skilled in the art and made familiar with applicant's teachings, numerous variations may be made in the herein described method and apparatus without departing from the spirit thereof. Accordingly, the invention is to be broadly construed within the scope of the appended claims.

Having thus described the invention and illustrated its use, what is claimed as new and is desired to be secured by Letters Patent is:

1. A process for the formation of discrete sheets of tempered glass from a continuous band of glass withdrawn from a melt, said band being at a temperature sufficiently high for tempering, which comprises the steps of subjecting the surfaces of said band to an initial period of rapid chilling to cool said band and induce a substantial temperature differential between the interior and the surfaces of said band, said initial rapid chilling being supplied at a rate to produce in said band a condition in which at least one surface of said band is at a temperature sufficiently low to be scored without substantial permanent plastic deformation of the surface surrounding the score line, and the interior of said sheet is at a temperature in excess of the strain relief temperature of the glass, forming a transverse score line across said at least one surface of said band, and breaking said band along said transverse score line to separate an increment from said band while said glass is in said condition, and continuing to subject said separated increment to additional rapid chilling influences to temper said increment.

2. The method of claim 1, including the step of causing said increment to be moved relative to the remainder of said band while said increment is in said condition to space the increment and band whereby the edge portions of said band and increment are subjected to said additional rapid chilling influence.

3. The method in accordance with claim 2, including the step of forming longitudinal score lines adjacent the side marginal edges or said band and breaking along said longitudinally extending score lines of said increment while said increment is in said condition.

4. The method in accordance with claim 1 wherein said scoring step is effected when the temperature differential between said surfaces and the interior is at or near the maximum differential occuring between said surfaces and interior.

5. The method in accordance with claim 4 wherein the temperature differential between said surfaces and the interior at the time of scoring is at least about 300°F.

6. The method in accordance with claim 1 wherein said glass comprises a conventional soda-lime formulation having a softening point of about 1350°F, Fahrenheit strain relief point about 940°, Fahrenheit annealing point about 1020°F, said glass being subjected to said initial rapid chilling influence when it is in the range of from about 1350°F to about 1050°F, being scored when the exterior temperature is below about 900°F.

7. The method in accordance with claim 1 and including the step of prolonging the time wherein said glass is in said condition by subjecting said band, following said initial period of rapid chilling, to continued chilling influences, said continued chilling influences being initially applied at a reduced rate as compared to said rapid chilling influence, said continued chilling influences thereafter progressively increasing.

8. The method in accordance with claim 7 wherein said rapid chilling influence is interrupted substantially at the point where said glass reaches said condition.

9. The method in accordance with claim 8 wherein said continued chilling influences are progressively increased at a rate wherein heat is extracted at a substantially constant rate.

10. The method in accordance withh claim 1, including the step of extending the time period during which said glass is maintained in said condition by subjecting said glass to a homogeneous heating source and extracting heat from the surfaces of said glass exposed to said source.

11. The method of forming discrete tempered sheets from a band or ribbon of glass substantially above the strain relief temperature, including the steps of causing increments of said ribbon to assume a condition in which the surfaces of said band are at a temperature sufficiently low to be scored without substantial permanent plastic deformation of the surfaces surrounding the score line and the interior of said band is at a temperature in excess of the strain relief temperature, by subjecting the surfaces of said heated band to an initial rapid chilling influence, thereafter interrupting the rapid chilling influence to which said band is subjected, forming a transverse score across said band, causing said band to break along said transverse score, separating the sheets formed as a result of breaking along said score, and thereafter subjecting said sheets to a chilling influence.

12. The method in accordance with claim 11 wherein the chilling influence applied to said separated sheets is applied at a progressively increasing rate.

* * * * *